(12) United States Patent
De Loub

(10) Patent No.: US 6,383,284 B1
(45) Date of Patent: May 7, 2002

(54) MASONRY RENDER

(75) Inventor: Judith Clare De Loub, Cardiff (AU)

(73) Assignee: Stuart Bradley De Loub, New South Wales (AU)

( * ) Notice: Subject to any disclaimer, the term of this patent is extended or adjusted under 35 U.S.C. 154(b) by 0 days.

(21) Appl. No.: 09/530,691

(22) PCT Filed: Nov. 4, 1998

(86) PCT No.: PCT/AU98/00927

§ 371 Date: May 4, 2000

§ 102(e) Date: May 4, 2000

(87) PCT Pub. No.: WO99/23044

PCT Pub. Date: May 14, 1999

(30) Foreign Application Priority Data

Nov. 4, 1997 (AU) .............................................. PP0192

(51) Int. Cl.[7] .......................... C04B 22/06; C04B 24/38; C04B 28/04

(52) U.S. Cl. ........................ 106/805; 106/729; 106/730; 106/731; 106/795

(58) Field of Search ................................. 106/720, 729, 106/730, 739, 805, 795

(56) References Cited

U.S. PATENT DOCUMENTS 4,280,848 A * 7/1981 Ellis et al. ..................... 524/2

FOREIGN PATENT DOCUMENTS

EP              269015       *  6/1988

* cited by examiner

*Primary Examiner*—Anthony Green
(74) *Attorney, Agent, or Firm*—Young & Thompson

(57) ABSTRACT

A dry masonry render mixture comprising, in concentrations which can be varied to achieve different finishes, Portland cement, river sand, graded stones, plasterers lime, the ingredients being mixed in the presence of lightweight filaments and silica-based catalyst. The dry render masonry mixture is mixed with a liquid solution of water and a latex polymer of various concentrations to form a slurry. The invention includes several methods of application of varying concentrations of the slurry to obtain different textured finishes.

21 Claims, No Drawings

MASONRY RENDER

FIELD OF THE INVENTION

This invention relates to surface renders in particular but not limited to durable and decorative masonry renders and methods of their application to the internal and external surfaces of buildings.

BACKGROUND ART

Concrete or cement based masonry renders are well known finishes applied to the external and internal walls of buildings. In general such prior art masonry renders are substantially comprised of a mixture of sand and Portland cement with additions such as plasterers lime and colouring agents. Most render finishes are applied manually to the building surface with a trowel, sponge or roller or may be sprayed under high pressure.

Problems associated with prior art renders include the tack of being generally waterproof as opposed to being merely water resistant. Other problems include a lack of adhesion of the render to smooth surfaces and different types of surfaces; breaking down of the render due to continued exposure to harsh sunlight or strong ultra violet light, shrinkage, and susceptibility to frost and fungal damage. In addition the composition of the render mixture must be such that during the application process it retains a workable consistency to achieve commercially satisfactory results.

OBJECT OF THE INVENTION

It Is therefore an object of the present invention to overcome or alleviate to at least some degree some of the problems associated with prior art masonry render mixtures and methods of their application.

OUTLINE OF THE INVENTION

In one broad aspect the invention resides in a dry masonry render mixture comprising the ingredients of Portland cement, river sand, graded stones, plasterers lime, said ingredients mixed in the presence of a filler typically of light weight filaments and silica based catalyst.

In a first preferred aspect the invention resides in a dry masonry render mixture comprising the following ingredients expressed as a percentage by weight:

Portland cement in the range 20%–36% and preferably about 31.37%;

plasterers lime in the range 1%–3% and preferably about 2.24%;

washed sand in the range 55%–70% and preferably about 64.40%;

silica based catalyst in the range 0.5%–3.5% and preferably about 1.87%; and hydroxypropyl methylcellulose filaments in the range 0.02%–0.35% and preferably about 0.12%.

In a second preferred aspect the invention resides in a dry masonry render mixture comprising the following ingredients expressed as a percentage by weight:

Portland cement in the range 20%–38% and preferably about 28.02%;

plasterers lime in the range 1%–3% and preferably about 1.91%;

washed sand in the range 48%–70% and preferably about 56.57%;

microspheres of fused alumina silicate in the range 8%–22% and preferably about 13.38%; and 0.12% hydroxypropyl methylcellulose filaments.

In a third preferred aspect the invention resides in a dry masonry render mixture comprising the following ingredients expressed as a percentage by weight:

Portland cement in the range 20%–35% and preferably about 27.53%;

plasterers lime in the range 1%–3% and preferably about 2.13%;

washed sand in the range 45%–65% and preferably about 56.25%;

graded stone in the range 8%–16% and preferably about 12.00%;

hydroxypropyl methylcellulose filaments in the range 0.05%–0.4% and preferably about 0.19%;

cement plasticiser in the range 0.02%–0.15% and preferably about 0.08%; and slica based catalyst in the range 0.08%–0.5%.

In a fourth preferred aspect the invention resides in a dry masonry render mixture comprising the following ingredients expressed as a percentage by weight:

Portland cement in the range 20%–35% and preferably about 28.23%;

plasterers lime in the range 1%–3% and preferably about 2.13%;

washed sand in the range 45%–65% and preferably about 58.82%;

graded stone in the range 8%–16% and preferably about 8.77%;

hydroxypropyl methylcellulose filaments in the range 0.05%–0.4% and preferably about 0.19%;

cement plasticiser in the range 0.02%–0.15% and preferably about 0.08%; and silica based catalyst in the range 0.08%–0.5%.

In a fifth preferred aspect the invention resides in a dry masonry render mixture comprising the following ingredients expressed as a percentage by weight:

Portland cement in the range 20%–35% and preferably about 27.53%;

plasterers lime in the range 1%–3% and preferably about 2.13%;

washed sand in the range 45%–65% and preferably about 56.25%;

graded stone in the range 8%–16% and preferably about 12.00%;

hydroxypropyl methylcellulose filaments in the range 0.05%–0.4% and preferably about 0.19%;

cement plasticiser in the range 0.02%–0.15% and preferably about 0.08%; and silica based catalyst in the range 0.08%–0.5%.

In a sixth preferred aspect the invention resides in a dry masonry render mixture comprising the following ingredients expressed as a percentage by weight:

Portland cement in the range 30%–40% and preferably about 31.23%;

plasterers lime in the range 1%–3% and preferably about 2.29%;

washed sand in the range 55%–70% and preferably about 64.25%;

silica based catalyst in the range 1% to 5% and preferably about 2.08%; and hydroxypropyl methylcellulose filaments in the range 0.01%–0.25% and preferably about 0.15%.

In a seventh preferred aspect the invention resides in a dry masonry render mixture comprising the following ingredients expressed as a percentage by weight:

Portland cement in the range 30%–40% and preferably about 31.66%;

plasterers lime in the range 1%–3% and preferably about 2.50%;

washed sand in the range 55%–70% and preferably about 64.25%;

silica based catalyst in the range 1% to 5% and preferably about 2.08%; and hydroxypropyl methylcellulose filaments in the range 0.010%–0.25% and preferably about 0.15%.

In an eighth preferred aspect the invention resides in a dry masonry render mixture comprising the following ingredients expressed as a percentage by weight:

Portland cement in the range 22%–33% and preferably about 31.52%;

plasterers lime in the range 1%–3% and preferably about 2.50%;

washed sand in the range 50%–65% and preferably about 63.75%;

silica based catalyst in the range 1% to 3% and preferably about 2.08%; and hydroxypropyl methylcellulose filaments in the range 0.01%–0.25% and preferably about 0.15%.

Preferably the washed sand is river sand of an average grain diameter of less than or equal to 0.5 mm.

Preferably the grade stone is washed river stone and depending on the actual texture of the surface ultimately desired the graded stones may be uniformly approximately 1.5 mm, 2.0 mm or 3.0 mm in diameter. Alternatively a mixture of different diameter stones in the same mixture may be used.

Suitably the microspheres are spherical particles of fused aluminium silicate having diameters in the ranges of one (1) to one hundred and fifty (150) microns and twelve (12) to four hundred and twenty five (425) microns. Suitably the hydroxypropyl methylcellulose filaments are in powdered form, and comprise powdered solid hydrophobic acid copolymer such as sodium salts of a polymeric acid copolymer which are dispersants for a wide range of inorganic and organic pigments used to colour the render.

Preferably the cement plasticiser is comprised of latex solids, water, sodium hydroxide and residual monomers.

The latex solids comprise primarily high molecular weight polymer with small amounts of other ingredients such as surfactants, antioxidants and preservations.

The residual monomers can include styrene, 4-phenylcyclohexene and 4-vinylcyclohexene.

Preferably the silica based catalyst is silica fume which is a dry densified microsilica powder and a by-product from silicon and ferrosilicon industries where they are produced in submerged electric arc furnaces.

In another aspect the invention resides in a method of application of a masonry render as hereinabove described to uneven surfaces comprising the steps of:

1. mixing dry render mixture to a required flexural strength with a range of 1:1 to 1:6 but preferably 1:4 ratio solution of copolymer latex and water to a workable consistency;
2. applying a uniformly 2 to 3 mm thick coating to the uneven surface avoiding depositing of cold joints in large drops to obtain a sand like finish.

In another aspect the invention resides in a method of application of a masonry render as hereinabove described over rough surfaces which require more build up to level the surface comprising the steps of:

1. mixing dry render mixture according to a required flexural strength with a range of 1:1 to 1:6 but preferably 1:4 ratio solution of copolymer latex and water to a workable consistency;
2. applying a uniformly 2 to 3 mm thick first coat to the rough surface avoiding depositing cold joints in large drops;
3. applying a second coat of dry render mixture mixed with a range of 1:1 to 1:6 but preferably 1:4 ratio solution of copolymer latex and water to a workable consistency;
4. preparing the second coat with an implement designed to apply a textured finish to the second coat when the render has almost set; and In another aspect the invention resides in a method of application of a masonry render as hereinabove described to a surface to provide a continuous seamless vertical scratch or swirl pattern finish comprising the steps of:

1. mixing dry render mixture accordingly to a required flexural strength with a range of 1:1 to 1:6 but preferably 1:4 ratio solution of copolymer latex and water to a workable consistency;
2. applying a first coat of 2 to 3 mm thickness to the surface;
3. mixing dry render with a range of 1:1 to 1:6 but preferably 1:4 ratio solution of copolymer latex and water to a workable consistency with graded stones;
4. applying a second coat approximately 3 mm thick of the mixture containing graded stones over the first coat;
5. creating scratch and/or swirl patterns in the second coat; and
6. applying 2 coats of an acrylic membrane paint to the second coat as a protective cover against dirt and grime to provide a washable surface.

In another aspect the invention resides in a method of application of a masonry render as hereinabove described where a flat "European" sand stone appearance is desired comprising the steps of:

1. mixing dry render mixture according to a required flexural strength with a range of 1:1 to 1:6 but preferably 1:4 ratio solution of copolymer latex and water to a workable consistency;
2. applying one coat directly to a surface or a surface having previously been prepared with a similar but less concentrated mixture; and
3. applying 2 coats of acrylic membrane paint to the coated surface as a protective cover against dirt and grime to provide a washable surface.

Preferably, the dry render mixture is mixed with the water and polymer solution using a mechanical stirrer to ensure complete mixing to a slurry of a workable consistency.

Suitably, the polymer is a carboxylated styrene/butadiene copolymer latex containing a non-staining antioxidant.

Preferably the implement used to apply a textured finish is a broom or a coarse brush, however, other implements providing a similar effect may also be used.

In applications where a coloured finish is needed, colouring agents may be added to the dry render mixture or slurry during the stirring process.

Whilst the above has been given by way of illustrative example of the present invention many variations and modifications thereto will be apparent to those skilled in the art without departing from the broad ambit and scope of the invention as herein set forth in the claims.

What is claimed is:

1. A dry masonry render mixture comprising the following ingredients expressed as a percentage by weight:
   cement in the range 20%–35%;
   plasterers lime in the range 1%–3%;
   washed sand in the range 45%–65%;
   1.5 mm–3.0 mm diameter graded stone in the range 8%–16%;
   hydroxypropyl methylcellulose filaments in the range 0.05%–0.4%;
   cement plasticiser comprised of latex solids, water, sodium hydroxide and residual monomers, in the range 0.02%–0.15%; and
   silica based catalyst comprising silica fume in the range 0.5%–3.5%.

2. A dry masonry render according to claim 1 comprising the following ingredients expressed as a percentage by weight:
   cement 27.53%;
   plasterers lime 2.13%;
   washed sand 56.25%;
   1.5 mm diameter graded stone 12.00%;
   hydroxypropyl methylcellulose filaments 0.19%;
   cement plasticiser 0.08%; and
   1.82% silica based catalyst.

3. A dry masonry render according to claim 1 comprising the following ingredients expressed as a percentage by weight:
   cement 28.23%;
   plasterers lime 2.13%;
   washed sand 58.82%;
   2.0 mm diameter graded stone 8.77%;
   hydroxypropyl methylcellulose filaments 0.19%;
   cement plasticiser 0.08%; and
   1.78% silica based catalyst.

4. A dry masonry render according to claim 1 comprising the following ingredients expressed as a percentage by weight:
   cement 27.53%;
   plasterers lime 2.13%;
   washed sand 56.25%;
   3.0 mm diameter graded stone 12.00%;
   hydroxypropyl methylcellulose filaments 0.19%
   cement plasticiser 0.08%; and
   1.82% silica based catalyst.

5. A dry masonry render mixture as claimed in claim 1 wherein the washed sand is river sand of a average grain diameter of less than or equal to 0.5 mm.

6. A dry masonry render mixture as claimed in claim 1 wherein the cement plasticiser is comprised of latex solids which comprise primarily carboxylated styrene/butadiene copolymer latex with other ingredients including surfactants, antioxidants and preservatives.

7. A dry masonry render mixture as claimed in claim 1 wherein the residual monomers include styrene, 4-phenylcyclohexene and 4-vinylcyclohexene.

8. A dry masonry render mixture as claimed in claim 1 wherein the silica based catalyst is silica fume being a dry densified microsilica powder.

9. A dry masonry render comprising the following ingredients expressed as a percentage by weight:
   cement in the range 20%–35%;
   plasterers lime in the range 1%–3%;
   washed sand in the range 45%–65%;
   2.0 mm diameter graded stone in the range 8%–16%;
   hydroxypropyl methylcellulose filaments in the range 0.05%–0.4%;
   cement plasticiser comprised of latex solids, water, sodium hydroxide and residual monomers, in the range 0.02%–0.15%; and
   silica based catalyst comprising silica fume in the range 0.08%–0.5%.

10. A dry masonry render comprising the following ingredients expressed as a percentage by weight:
    cement in the range 20%–35%;
    plasterers lime in the range 1%–3%;
    washed sand in the range 45%–65%;
    3.0mm diameter graded stone in the range 8%–16%;
    hydroxypropyl methylcelulose filaments in the range 0.05%–0.4%;
    cement plasticiser comprised of latex solids, water, sodium hydroxide and residual monomers, in the range 0.02%–0.15%; and
    silica based catalyst comprising silica fume in the range 0.08%–0.5%.

11. A dry masonry render mixture comprising the following ingredients expressed as a percentage by weight:
    cement in the range 20%–40%;
    plasterers lime in a range 1%–3%;
    washed sand in the range 45%–70%;
    silica based catalyst in the range 0.5% 3.5%; and
    hydroxypropyl methylcellulose filaments in the range 0.01%–0.35%.

12. A dry masonry render mixture according to claim 11 comprising the following ingredients expressed as a percentage by weight:
    cement in the range 20%–36%;
    plasterers lime in a range 1%–3%;
    washed sand in the range 55%–70%;
    silica based catalyst in the range 0.5%–3.5%; and
    hydroxypropyl methylcellulose filaments in the range 0.02%–0.35%.

13. A dry masonry render mixture according to claim 11 comprising the following ingredients expressed as a percentage by weight:
    cement 31.37%;
    plasterers lime 2.24%;
    washed sand 64.40%;
    silica based catalyst 1.87%; and
    hydroxypropyl methylcellulose filaments 0.12%.

14. A dry masonry render mixture according to claim 11 comprising the following ingredients expressed as a percentage by weight:
    cement in the range 22%–33%;
    plasterers lime in the range 1%–3%;
    washed sand in the range 50%–65%;
    silica based catalyst in the range 1%–3%; and
    hydroxypropyl methylcellulose filaments in the range 0.01%–0.25%.

15. A dry masonry render mixture according to claim 11 comprising the following ingredients expressed as a percentage by weight:
    cement 31.52%;

plasterers lime 2.50%;

washed sand 63.75%;

silica based catalyst 2.08%; and 0.15% hydroxypropyl methylcellulose filaments.

16. A dry masonry render mixture according to claim 11 wherein the washed sand is river sand of an average grain diameter of less than or equal to 0.5 mm.

17. A dry masonry render mixture comprising the following ingredients expressed as a percentage by weight:

cement in the range 20%–38%;

plasterers lime in the range 1%–3%;

washed sand in the range 48%–70%;

microspheres of fused alumina silicate in the range 8%–22%; and 0.12% hydroxypropyl methylcellulose filaments.

18. A dry masonry render mixture according to claim 17 comprising the following ingredients expressed as a percentage by weight:

cement 28.02%;

plasterers lime 1.91%;

washed sand 56.57%;

microspheres of fused alumina silicate 13.38%; and 0.12% hydroxypropyl methylcellulose filaments.

19. A dry masonry render mixture according to claim 17 wherein the washed sand is river sand of a average grain diameter of less than or equal to 0.5 mm.

20. A dry masonry render mixture as claimed in claim 17 wherein the microspheres are spherical particles of fused aluminium silicate having diameters in the range of one (1) to one hundred and fifty (150) microns.

21. A dry masonry render mixture as claimed in claim 17, wherein the microspheres are spherical particles of fused aluminium silicate having diameters in the range of twelve (12) to four hundred and twenty five (425) microns.

* * * * *